(12) United States Patent
Kawamoto et al.

(10) Patent No.: US 9,062,691 B2
(45) Date of Patent: Jun. 23, 2015

(54) HYDRAULIC OIL TANK FOR CONSTRUCTION MACHINE

(75) Inventors: Junya Kawamoto, Tsuchiura (JP); Kohei Maeda, Tsuchiura (JP); Kentaro Kamakura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 152 days.

(21) Appl. No.: 14/001,125

(22) PCT Filed: Feb. 10, 2012

(86) PCT No.: PCT/JP2012/053150
§ 371 (c)(1),
(2), (4) Date: Aug. 22, 2013

(87) PCT Pub. No.: WO2012/114913
PCT Pub. Date: Aug. 30, 2012

(65) Prior Publication Data
US 2013/0327427 A1    Dec. 12, 2013

(30) Foreign Application Priority Data

Feb. 23, 2011   (JP) ................. 2011-037356

(51) Int. Cl.
| | |
|---|---|
| *G01F 23/00* | (2006.01) |
| *F15B 1/26* | (2006.01) |
| *G01F 9/00* | (2006.01) |
| *E02F 9/08* | (2006.01) |
| *E02F 3/32* | (2006.01) |
| *E02F 9/26* | (2006.01) |

(52) U.S. Cl.
CPC ... *F15B 1/26* (2013.01); *G01F 9/00* (2013.01); *E02F 9/0883* (2013.01); *E02F 3/325* (2013.01); *E02F 9/26* (2013.01)

(58) Field of Classification Search
None
See application file for complete search history.

(56) References Cited

U.S. PATENT DOCUMENTS

| | | | |
|---|---|---|---|
| 2009/0166934 A1* | 7/2009 | Masse et al. | 264/537 |
| 2013/0312497 A1* | 11/2013 | Chikamune | 73/53.01 |
| 2013/0341934 A1* | 12/2013 | Kawanishi | 290/1 A |
| 2014/0000726 A1* | 1/2014 | Kawamoto et al. | 137/351 |

FOREIGN PATENT DOCUMENTS

| | | |
|---|---|---|
| JP | 9-2578 A | 1/1997 |
| JP | 2005-264557 A | 9/2005 |
| JP | 2006-15845 A | 1/2006 |
| JP | 2006-321294 A | 11/2006 |
| JP | 2007-90953 A | 4/2007 |

OTHER PUBLICATIONS

Corresponding International Search Report with English Translation dated May 15, 2012 (five (5) pages).

* cited by examiner

*Primary Examiner* — Andre Allen
(74) *Attorney, Agent, or Firm* — Crowell & Moring LLP (57) ABSTRACT

A hydraulic oil tank capable of assuring strength at a gage installation part and bringing a gage close to a hole portion of an exterior cover while maintaining a predetermined clearance between the exterior cover and the hydraulic oil tank is provided. The hydraulic oil tank, mounted on a swing frame of a hydraulic excavator upperstructure, has a side wall opposing an upperstructure exterior cover with a predetermined clearance, and is adapted to store hydraulic oil to be fed to hydraulic actuators. The hydraulic oil tank has a gage enabling a visual check on the hydraulic oil level in the tank through a hole portion in the exterior cover. The gage is installed in the tank side wall, with an internally-hollow protruding portion protruding toward the exterior cover hole portion and a transparent window portion arranged at an end of the protruding portion.

6 Claims, 6 Drawing Sheets

HYDRAULIC OIL TANK FOR CONSTRUCTION MACHINE

TECHNICAL FIELD

This invention relates to a hydraulic oil tank for a construction machine such as a compact excavator, said hydraulic oil tank being mounted on the construction machine and having a gage that enables a visual check on the level of hydraulic oil.

BACKGROUND ART

In a construction machine such as a hydraulic excavator having an upperstructure provided with an exterior cover, working equipment attached to the upperstructure and including a boom, arm, bucket and the like, and hydraulic actuators including a swing motor for driving the upperstructure and an actuator for driving the working equipment, a steel-made hydraulic oil tank, specifically a steel-made hydraulic oil tank adapted to store pressure oil to be fed to the above-mentioned hydraulic actuators is mounted in many instances from the viewpoint of the assurance of strength. When a hydraulic oil tank is mounted together with an engine, hydraulic pumps, control valves, a swing motor and the like in an extremely narrow, equipment installation space on an upperstructure as in a compact excavator, a hydraulic oil tank made of synthetic resin may, however, be mounted for its easy moldability into a complex shape. Compared with a steel-made hydraulic oil tank, such a hydraulic oil tank made of synthetic resin has advantages that it requires neither painting nor anti-rust treatment, is light weight, and allows less transmission of heat from the hydraulic oil stored inside to the outside.

Such a hydraulic oil tank made of synthetic resin is mounted such that its side wall opposes the exterior cover of the upperstructure, generally with a predetermined clearance maintained relative to the exterior cover to avoid interferences or contact with the exterior cover by bumping or the like of the body. Further, this hydraulic oil tank is provided with a gage comprised of a transparent member that enables a visual check on the level of hydraulic oil stored inside through a hole portion formed in the exterior cover. The visual check on the level of hydraulic oil via such a gage is to ascertain whether or not the amount of the hydraulic oil stored in the hydraulic oil tank has gone down as a result of an operation over a long time. When the hydraulic oil in the hydraulic oil tank has gone down beyond an acceptable value, the replacement or the like of the hydraulic oil in the hydraulic oil tank is performed, for example. A hydraulic oil tank made of synthetic resin, which is of this type, is disclosed, for example, in Patent Document 1.

PRIOR ART DOCUMENT

Patent Document

Patent Document 1: JP-A-9-2578

DISCLOSURE OF THE INVENTION

Problem to Be Solved by the Invention

The above-mentioned hydraulic oil tank made of synthetic resin, however, is weaker in strength than one made of steel. A conventional hydraulic oil tank, therefore, involves a potential problem that it may deform as a result of pressurization or depressurization in the hydraulic oil tank by waving of the level of the hydraulic oil in the hydraulic oil tank as caused by work or the like performed by the construction machine or by repeated up and down movements of the oil level depending on the manner of use of hydraulic actuators (hydraulic cylinder and hydraulic motor). As a result, a gage installation part may deform, thereby possibly making it difficult to check the position of the oil level upon a visual check on the level of the hydraulic oil in the hydraulic oil tank from the gage through a hole portion of the exterior cover. In other words, the conventional technology has a potential problem that the visibility may be lowered.

Further, the conventional hydraulic oil tank is mounted with a predetermined clearance maintained between the exterior cover and the side wall of the hydraulic oil tank to prevent interference or the like. The gage is, therefore, located apart from the hole portion of the exterior cover by a distance corresponding to the above-mentioned clearance. In this respect too, a visual check on the position of the oil level in the hydraulic oil tank tends to become difficult, and no improvement can be expected in visibility.

With the conventional hydraulic oil tank, a space which corresponds to the above-mentioned predetermined clearance is formed between the exterior cover and the gage, specifically between the hole portion of the exterior cover and the gage. There is, accordingly, a potential problem that rain water or the like may penetrate inside the exterior cover, specifically to the interior of the upperstructure through the hole portion of the exterior cover and the above-mentioned space. In other words, the conventional hydraulic oil tank also has a problem in sealing performance.

With the foregoing actual situation of the above-mentioned conventional technology in view, the present invention has as an object thereof the provision of a hydraulic oil tank for a construction machine, said hydraulic oil tank being capable of assuring strength at a gage installation part and bringing a gage close to a hole portion of an exterior cover while maintaining a predetermined clearance between the exterior cover and the hydraulic oil tank.

Means for Solving the Problem

To achieve this object, the present invention provides a hydraulic oil tank for a construction machine having an upperstructure provided with an exterior cover, working equipment attached to the upperstructure, and hydraulic actuators comprised of a swing motor for driving the upperstructure and an actuator for driving the working equipment, said hydraulic oil tank being mounted on a swing frame of the upperstructure, having a side wall opposing the exterior cover of the upperstructure with a predetermined clearance therebetween, being made of synthetic resin and adapted to store hydraulic oil to be fed to the hydraulic actuators, and having a gage that enables a visual check on a level of the hydraulic oil in the hydraulic oil tank through a hole portion formed in the exterior cover, wherein the gage is installed in the side wall of the hydraulic oil tank, and has an internally-hollow protruding portion formed protruding in a direction toward the hole portion of the exterior cover and a window portion comprised of a transparent member arranged at an end of the protruding portion and enabling the visual check on the level of the hydraulic oil in the hydraulic oil tank.

According to the present invention constructed as described above, the gage has the protruding portion formed protruding from the side wall of the hydraulic oil tank so that strength can be assured at a gage installation part. Owing to this feature, it is possible to reduce the deformation of the gage installation part, which occurs by waving of the level of the hydraulic oil in the hydraulic oil tank as caused by work or the like performed by the working equipment or by repeated up and down movements of the oil level depending on the manner of use of hydraulic actuators. Upon a visual check on the position of the level of the hydraulic oil in the hydraulic oil tank from the window portion of the gage through the hole portion of the exterior cover, the check on the position of the oil level can, therefore, be accurately conducted through the gage which has undergone no deformation. In the present invention, the window portion of the gage is arranged at the end of the protruding portion that protrudes in the direction toward the hole portion of the exterior cover. Therefore, the hydraulic oil in the hydraulic oil tank can be guided through the hollow protruding portion to the window portion located close to the hole portion of the exterior cover while the predetermined clearance is maintained between the exterior cover and the hydraulic oil tank. Upon visually checking the position of the level of the hydraulic oil in the hydraulic oil tank from the window portion of the gage through the hole portion of the exterior cover, this visual check on the oil level can hence be facilitated, thereby making it possible to accurately conduct the check on the position of the oil level.

In the present invention, the hole portion of the exterior cover is filled by the window portion of the gage owing to the arrangement of the window portion of the gage in close proximity to the hole portion of the exterior cover. Owing to this feature, it is possible to prevent rain water or the like from penetrating into the upperstructure from the hole portion of the exterior cover.

In the above-described invention, the protruding portion of the gage may have an external shape of a truncated circular cone. The present invention constructed as described above can make smaller, by an outer surface of the protruding portion, a space in the upperstructure at a position around the hole portion of the exterior cover, and therefore, is effective for the prevention of the penetration of rain water or the like.

In the above-described invention, the window portion of the gage may be positioned in the hole portion of the exterior cover. The present invention constructed as described above can close a majority of the hole portion of the exterior cover by the window portion of the gage, and therefore, is effective for the prevention of the penetration of rain water or the like.

In the above-described invention, the construction machine may be a compact excavator of a type that a rear-end section thereof stays within an undercarriage width thereof during swinging.

Advantageous Effects of the Invention

According to the present invention, the formation of the protruding portion can assure strength at the gage installation part, and can also reduce the deformation of the gage installation part, which occurs by waving of the level of the hydraulic oil stored in the hydraulic oil tank or by repeated up and down movements of the oil level depending on the manner of use of the hydraulic actuators. The present invention can also guide the hydraulic oil, which is stored in the hydraulic oil tank, to the window portion through the hollow protruding portion. Therefore, the present invention can assure strength at the gage installation part, and can also bring the gage close to the hole portion of the exterior cover while maintaining the predetermined clearance between the exterior cover and the hydraulic oil tank. Upon a visual check on the position of the level of the hydraulic oil in the hydraulic oil tank from the window portion of the gage through the hole portion of the exterior cover, the present invention hence facilitates to see the oil level so that the check on the position of the oil level can be conducted accurately, and moreover, readily, and the visibility for the level of the hydraulic oil can be improved compared with before. In addition, it is possible to prevent rain water or the like from penetrating from the hole portion of the exterior cover, and hence to improve the sealing performance for the hole portion of the exterior cover compared with before.

BRIEF DESCRIPTION OF THE DRAWINGS

FIGS. 8A to 8C illustrate the hydraulic oil tank according to this embodiment with the hydraulic oil stored therein, in which

MODES FOR CARRYING OUT THE INVENTION

A hydraulic oil tank according to an embodiment of the present invention for a construction machine will hereinafter be described with reference to the drawings.

Figure 1:
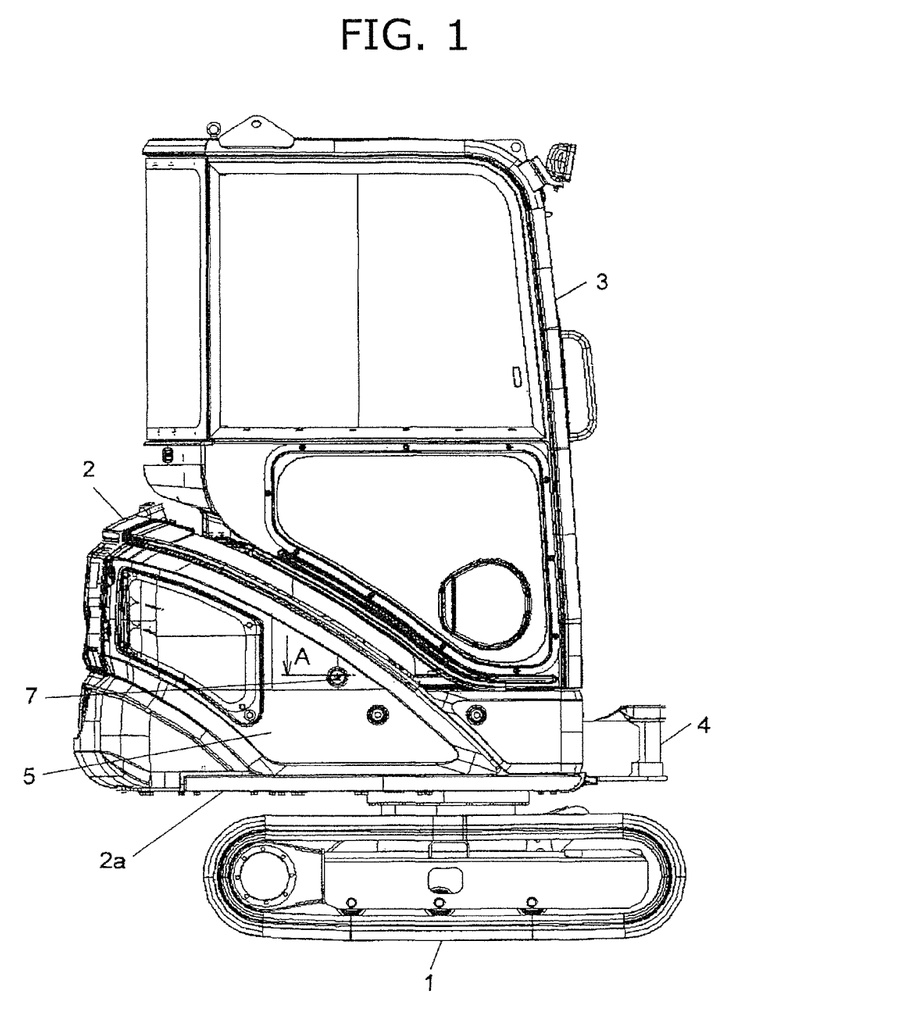
FIG. 1 is a side view of essential parts of a compact excavator exemplified as a construction machine on which a hydraulic oil tank according to an embodiment of the present invention can be mounted.
Figure 3:
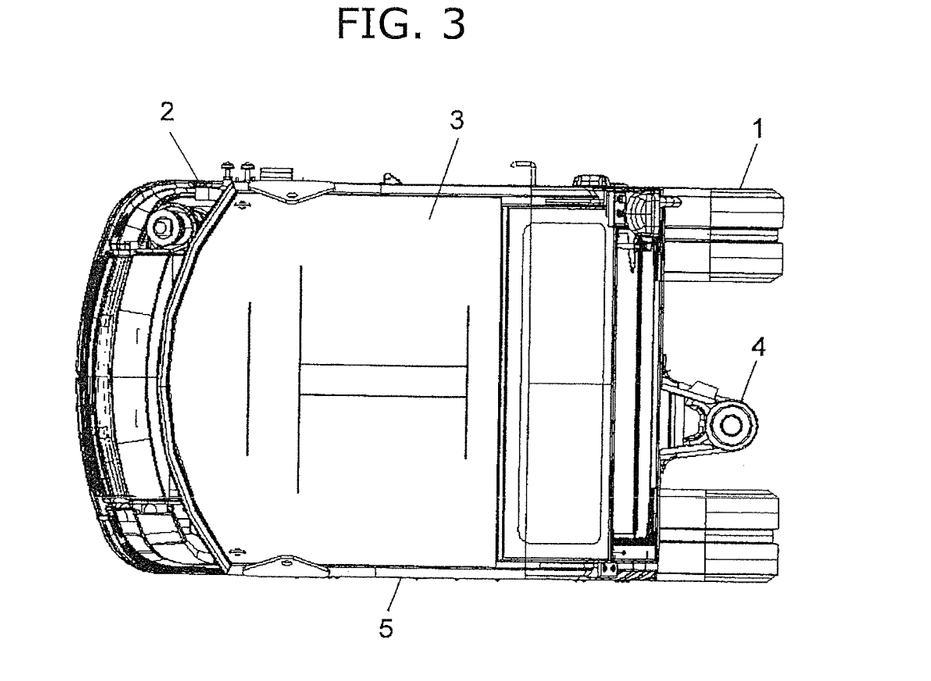
FIG. 3 is a plan view of essential parts of the compact excavator shown in FIG. 1.

The construction machine on which the hydraulic oil tank according to this embodiment can be mounted is, for example, a compact excavator of a type that its rear-end section stays within its undercarriage width during swinging. In the compact excavator, the installation area for various equipment is narrow, and the mounting of the hydraulic oil tank is hence liable to restrictions. As shown in FIGS. 1 and 3, this compact excavator is provided with a travel base 1 and an upperstructure 2 mounted on the travel base 1. On the upperstructure 2, an operator's cab 3 is arranged. Unillustrated working equipment is attached to a working equipment connecting part 4. The unillustrated working equipment includes, for example, a boom, an arm, a bucket, and hydraulic actuators such as a boom cylinder, arm cylinder and bucket cylinder, and performs digging work or the like of earth or sand. It is to be noted that the compact excavator is also provided with hydraulic actuators such as a travel motor for allowing the travel base 1 to run and a swing motor for allowing the upperstructure 2 to swing.

Figure 4:
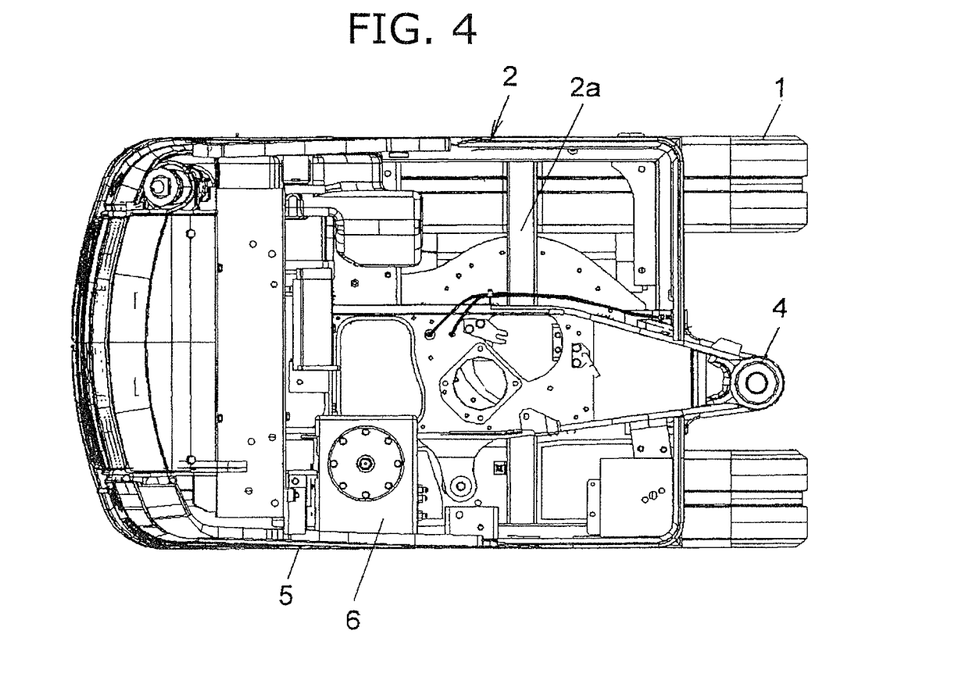
FIG. 4 is a plan view of essential parts, which illustrates a state that an operator's cab has been removed from the state shown in FIG. 3.
Figure 5:
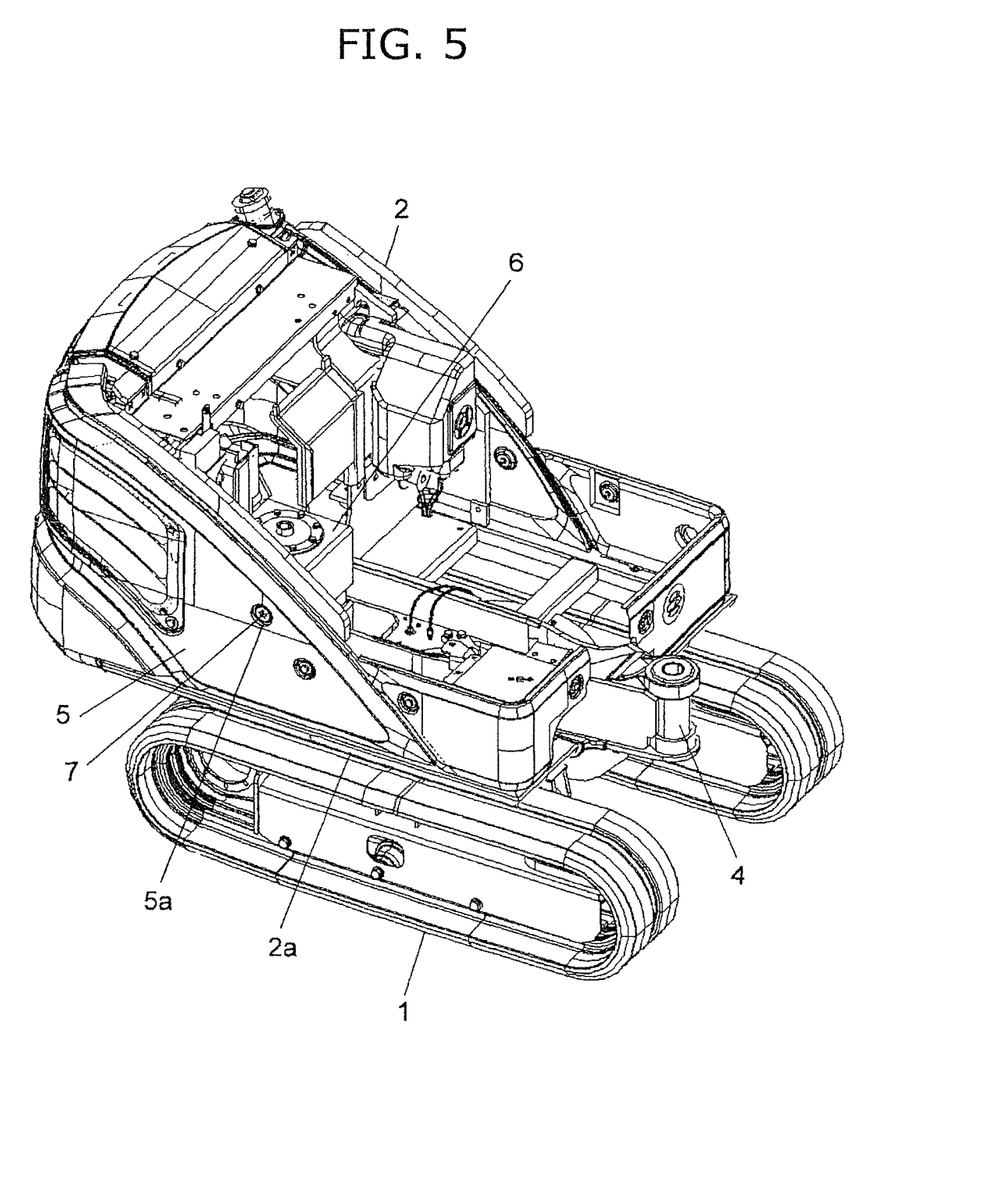
FIG. 5 is a perspective view of essential parts, which illustrates a state that the operator's cab of the compact excavator shown in FIG. 1 has been removed.
Figure 6:
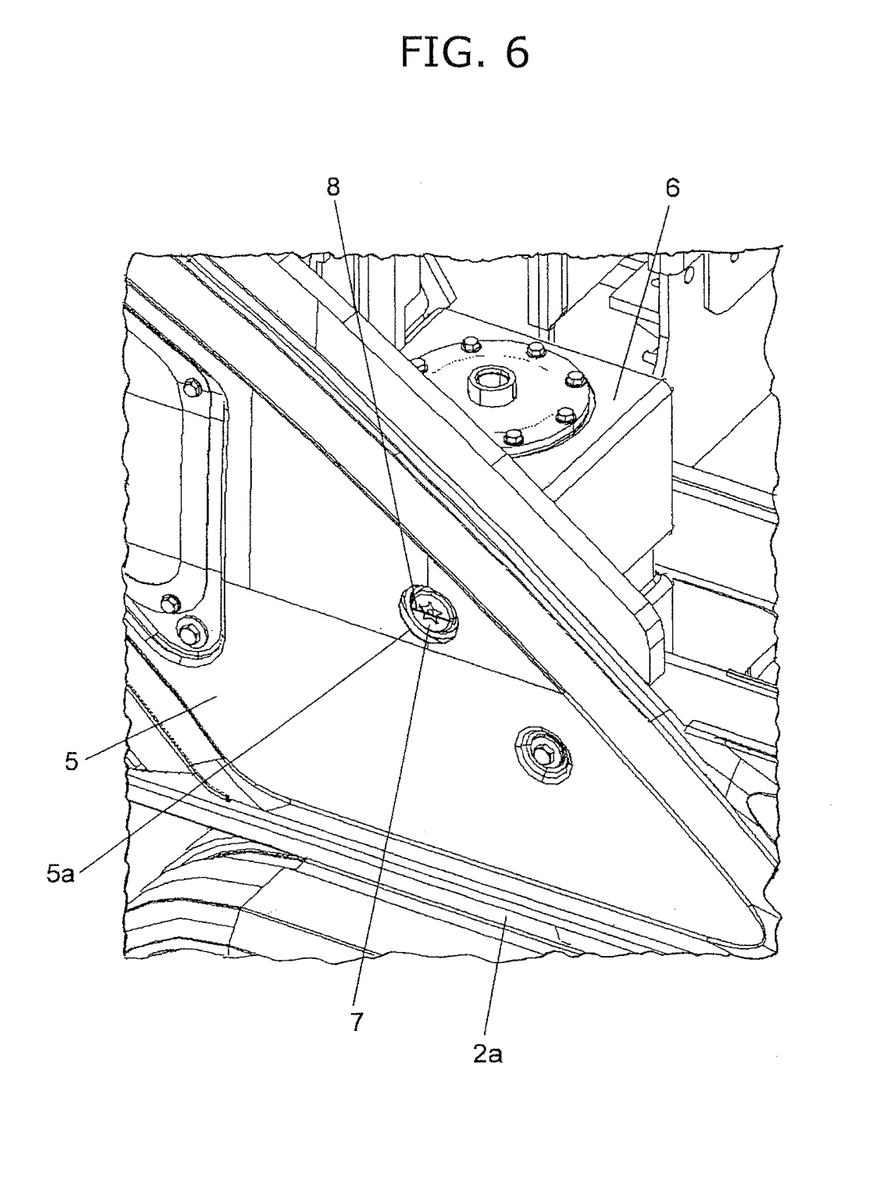
FIG. 6 is an enlarged fragmentary view of FIG. 5.

The hydraulic oil tank 6 according to this embodiment is made of synthetic resin, is mounted on a swing frame 2a of the upperstructure 2 as illustrated in FIGS. 4, 5 and 6, has a side wall 6a opposing an exterior cover 5 of the upperstructure 2 with a predetermined clearance 20 therebetween, and is adapted to store hydraulic oil to be fed to the above-mentioned hydraulic actuators.

Figure 2:
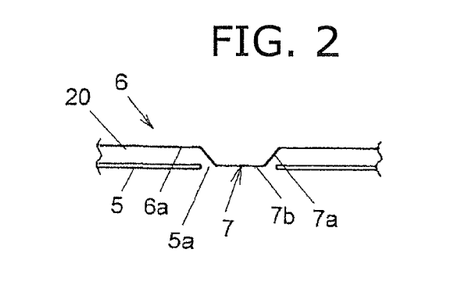
FIG. 2 is an enlarged cross-sectional view taken in arrow A.

As shown in FIGS. 1, 2 and 6, this hydraulic oil tank 6 has a gage 7, which enables a visual check on a level 8 of the hydraulic oil in the hydraulic oil tank 6 through a hole portion 5a formed in the exterior cover 5 of the upperstructure 2.

Figure 7:
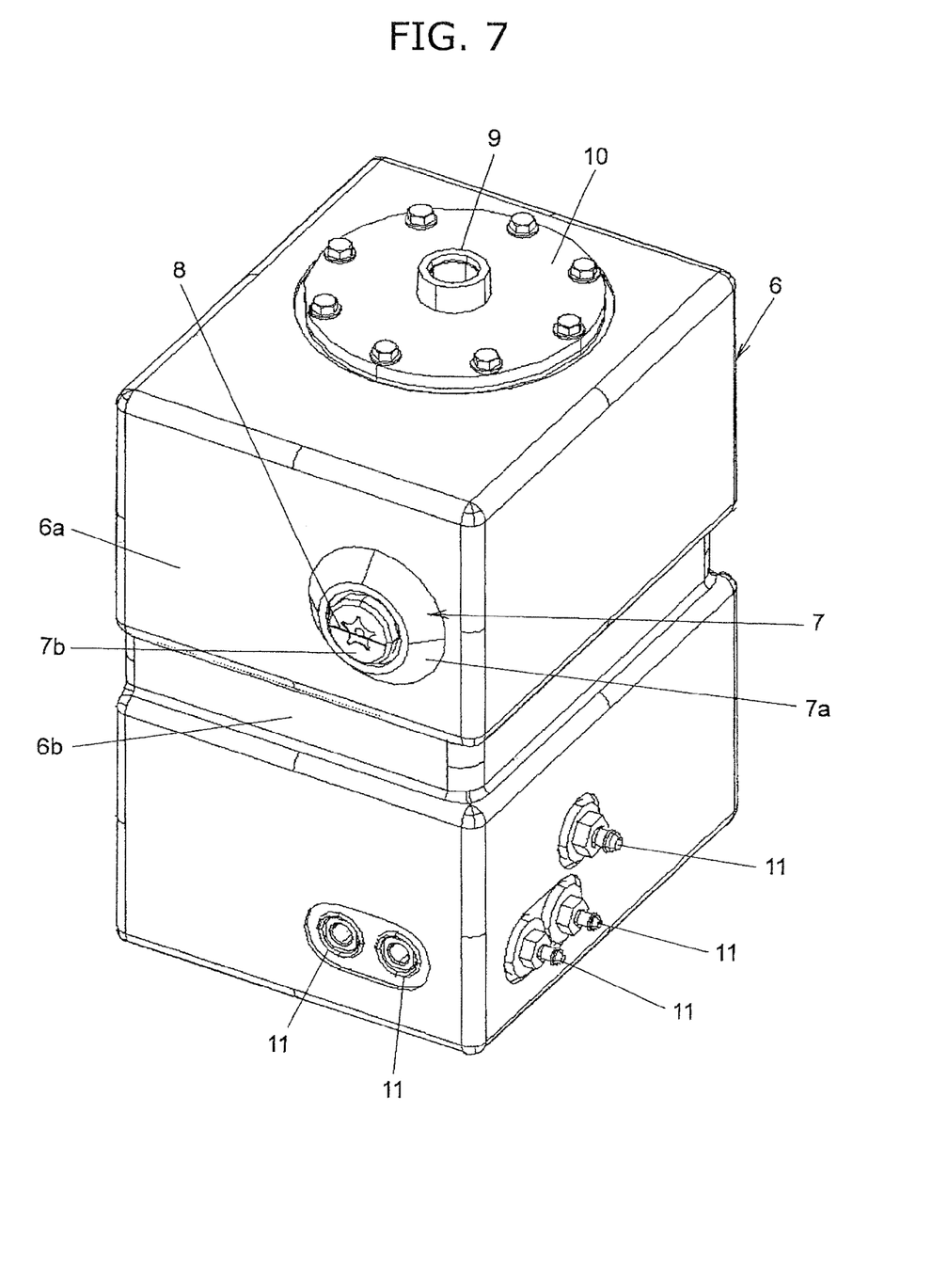
FIG. 7 is a perspective view illustrating the hydraulic oil tank according to this embodiment with hydraulic oil stored therein.
Figures 8A, 8B, 8C:
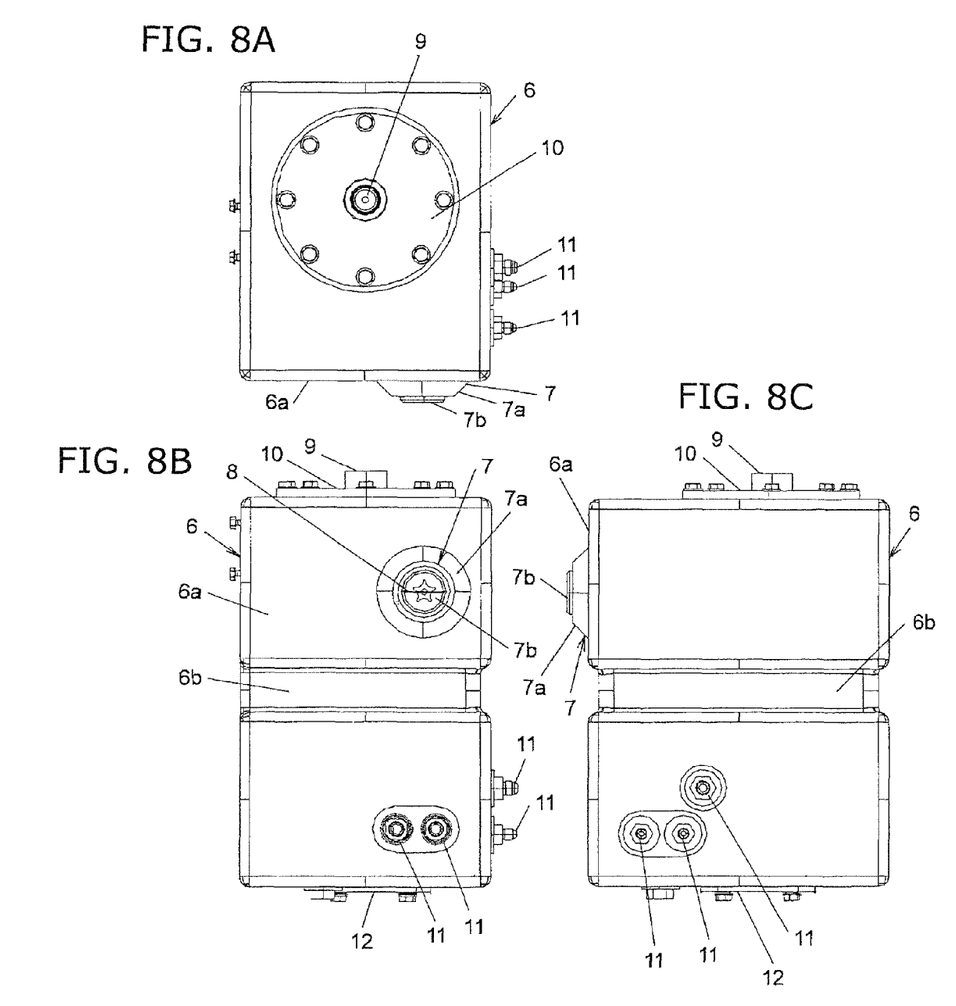
FIG. 8A is a plan view.
FIG. 8B is a front view.
FIG. 8C is a side view.

As illustrated in FIGS. 7 and 8A to 8C, the hydraulic oil tank 6 is molded, for example, in a rectangular parallelepiped as its basic external shape, and a band-shaped recessed part 6b is formed in a central section thereof. By this recessed part 6b, the overall strength of the hydraulic oil tank 6 made of synthetic resin is assured. As also illustrated in FIGS. 7 and 8A. to 8C, the hydraulic oil tank 6 has a filter 10 for conducting filtration of the hydraulic oil to maintain it in a clean state, a connection fitting 9 to which a return pipe is connected to guide return oil from the hydraulic actuators, said connection fitting 10 being arranged at the position of the filter 10, connection fittings 11 to which drain pipes are connected, respectively, and a connection fitting 12 to which a feed pipe is connected to feed hydraulic oil to unillustrated hydraulic pumps.

As illustrated, for example, in FIGS. 2, 6 and 7, the gage 7 of the hydraulic oil tank 6 is installed in the side wall 6a of the hydraulic oil tank 6a, said side wall 6a opposing the exterior cover 5, and has an internally-hollow protruding portion 7a formed protruding in a direction toward the hole portion 5a of the exterior cover 5 and a window portion 7b comprised of a transparent member arranged at an end of the protruding portion 7a and enabling a visual check on the level 8 of the hydraulic oil in the hydraulic oil tank 6.

As illustrated in FIGS. 2 and 8, the protruding portion 7a of the gage 7 has, for example, an outer shape of a truncated regular cone. As also illustrated in FIG. 2, the window portion 7b of the gage 7 is positioned, for example, in the hole portion 5a of the exterior cover 5.

With respect to the hydraulic oil tank 6 constructed as described above and mounted on the swing frame 2a of the upperstructure 2, visual checks are conducted during work performed over a long time by the working equipment as to whether or not the amount of the hydraulic oil stored inside, specifically the position of the level 8 of the hydraulic oil is within an acceptable range. These visual checks are conducted by visually seeing, from the window portion 7b of the gage 7 through the hole portion 5a of the exterior cover 5, the level of the level 8 of the hydraulic oil stored in the hydraulic oil tank 6.

According to the hydraulic oil tank 6 of this embodiment constructed as described above, the gage 7 has the protruding portion 7a so that a protruding part is formed on the planar side wall 6a of the hydraulic oil tank 6. By the protruding part, strength is assured at the installation part of the gage 7. Owing to this feature, it is possible to reduce the deformation of the installation part of the gage 7, which occurs by waving of the level 8 of the hydraulic oil in the hydraulic oil tank 6 as caused by work or the like performed by unillustrated working equipment or by repeated up and down movements of the oil level depending on the manner of use of hydraulic actuators. According to this embodiment, the hydraulic oil in the hydraulic oil tank 6 can also be guided through the hollow protruding portion 7a to the window portion 7b.

Therefore, this embodiment can assure strength at the installation part of the gage 7, and also can bring the gage 7 close to the hole portion 5a of the exterior cover 5 while the predetermined clearance 20 is maintained between the exterior cover 5 and the hydraulic oil tank 6. Upon visually checking the position of the level 8 of the hydraulic oil in the hydraulic oil tank 6 from the window portion 7b of the gage 7 through the hole portion 5a of the exterior cover 5, this embodiment, therefore, facilitates to see the oil level 8. The check on the position of the oil level 8 can be conducted accurately, and moreover, readily, and the visibility for the oil level 8 of the hydraulic oil can be improved.

In this embodiment, the hole portion 5a of the exterior cover 5 is filled by the window portion 7b of the gage 7 owing to the arrangement of the window portion 7b of the gage 7 in close proximity to the hole portion 5a of the exterior cover 5. Owing to this feature, it is possible to prevent rain water or the like from penetrating into the upperstructure 2 from the hole portion 5a of the exterior cover 5. Especially in this embodiment, the external shape of the protruding portion 7a is formed in the truncated circular cone shape. As illustrated in FIG. 2, the space in the upperstructure 2 at the position around the hole portion 5a of the exterior cover 5 can, therefore, be made smaller by the outer surface of the protruding portion 7a. Owing to this feature, this embodiment is effective for the prevention of the penetration of rain water or the like. In this embodiment, the window portion 7b of the gage 7 is positioned in the hole portion 5a of the exterior cover 5. A majority of the hole portion 5a of the exterior cover 5 is, therefore, closed by the window portion 7b of the gage 7. This feature is also effective for the prevention of the penetration of rain water or the like. For these features, this embodiment can provide improved sealing performance for the hole portion 5a of the exterior cover 5.

LEGEND

1 Travel base
2 Upperstructure
2a Swing frame
3 Operator's cab
4 Working equipment connecting part
5 Exterior cover
5a Hole portion
6 Hydraulic oil tank
6a Side wall
7 Gage
7a Protruding portion
7b Window portion
8 oil level
20 Clearance

The invention claimed is:

1. A hydraulic oil tank for a construction machine having an upperstructure provided with an exterior cover, working equipment attached to the upperstructure, and hydraulic actuators comprised of a swing motor for driving the upperstructure and an actuator for driving the working equipment,
   said hydraulic oil tank being mounted on a swing frame of the upperstructure, having a side wall opposing the exterior cover of the upperstructure with a predetermined clearance therebetween, being made of synthetic resin and adapted to store hydraulic oil to be fed to the hydraulic actuators, and having a gage that enables a visual check on a level of the hydraulic oil in the hydraulic oil tank through a hole portion formed in the exterior cover, wherein:
   the gage is installed in the side wall of the hydraulic oil tank, and has an internally-hollow protruding portion formed protruding in a direction toward the hole portion of the exterior cover and a window portion comprised of a transparent member arranged at an end of the protruding portion and enabling the visual check on the level of the hydraulic oil in the hydraulic oil tank.

2. The hydraulic oil tank according to claim 1, wherein:
   the protruding portion of the gage has an external shape of a truncated circular cone.

3. The hydraulic oil tank according to claim 2, wherein:
   the window portion of the gage is positioned in the hole portion of the exterior cover.

4. The hydraulic oil tank according to claim 1, wherein:
the construction machine is a compact excavator of a type that a rear-end section thereof stays within an undercarriage width thereof during swinging.

5. The hydraulic oil tank according to claim 2, wherein:
the construction machine is a compact excavator of a type that a rear-end section thereof stays within an undercarriage width thereof during swinging.

6. The hydraulic oil tank according to claim 3, wherein:
the construction machine is a compact excavator of a type that a rear-end section thereof stays within an undercarriage width thereof during swinging.

* * * * *